July 7, 1953           M. COHEN           2,644,469
DENTAL FLOSS CONTAINER AND MANIPULATOR
Filed Oct. 4, 1951
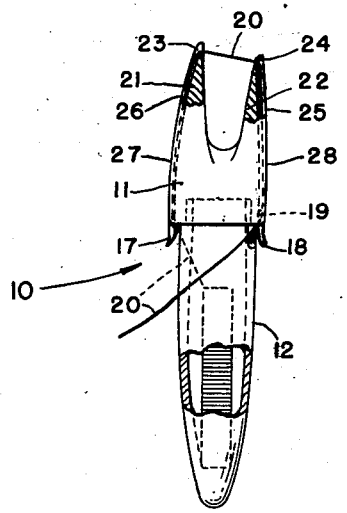
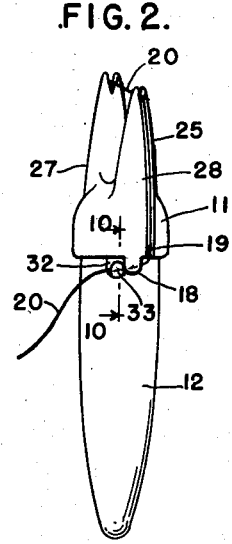
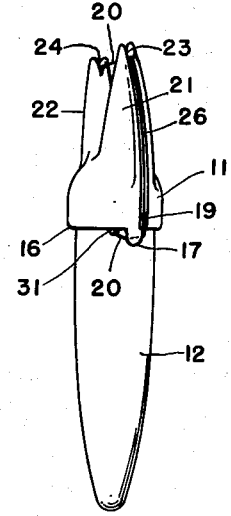
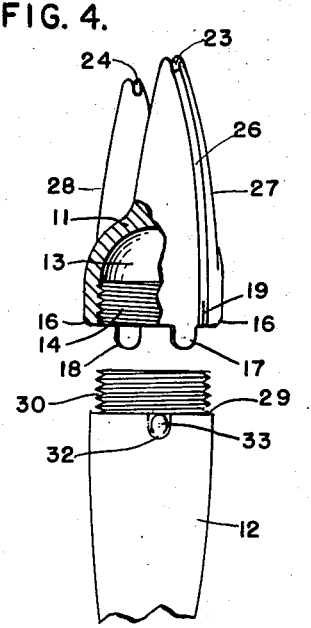
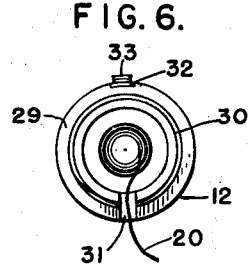
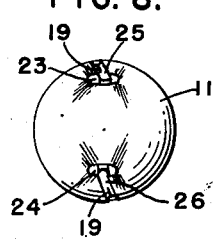
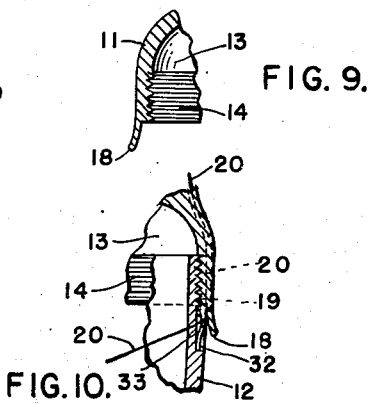
INVENTOR
MAXIMILIAN COHEN,
BY
*Irving Seidman*
ATTORNEY Patented July 7, 1953

2,644,469

UNITED STATES PATENT OFFICE 2,644,469

DENTAL FLOSS CONTAINER AND MANIPULATOR

Maximilian Cohen, Brooklyn, N. Y.

Application October 4, 1951, Serial No. 249,758

5 Claims. (Cl. 132—92)

This invention relates to improvements in a dental floss holder.

Broadly, it is an object of the invention to provide a dental floss holder for cleaning the interstices of the teeth with ease and without danger of injury to the gums.

More particularly, it is an object of the invention to provide both a sanitary dental floss holder protected against foreign material and from the saliva of the mouth when in use.

Another object of the invention is to provide a cutting edge for the dental floss which also acts as auxiliary gripping means for the dental floss.

Still another object is to provide a holder and a reservoir for dental floss which permits the floss to bridge two prongs in a taut condition so that it cannot slip and cannot injure the gums, cheeks and tongue in any manner.

Another object is to provide prongs to hold the dental floss so shaped as to permit the bridged floss to reach all the interdental and intermolar spaces without injury to any part of the mouth and to permit the floss to be quickly unthreaded and rethreaded after use, using only short lengths of the floss.

For a fuller understanding of the nature and objects of the invention, reference is had to the following detailed description, in connection with the accompanying drawings, in which:

Fig. 1 is a side elevational view of a dental floss holder, with parts broken away.

Fig. 2 is a front perspective view of the holder shown in Fig. 1.

Fig. 3 is a rear perspective view (the side opposite Fig. 2).

Fig. 4 is an enlarged elevational view of the cap in perspective with parts broken away.

Fig. 5 is an enlarged elevational view of the hollow base or reservoir of the holder with the bottom broken away.

Fig. 6 is an enlarged top view of the base.

Fig. 7 is an enlarged elevational view of the base from the side opposite Fig. 5.

Fig. 8 is an enlarged top view of the cap.

Fig. 9 is an enlarged fragmentary sectional view of the lower end of the cap.

Fig. 10 is an enlarged fragmentary view of the lower end of the cap seated upon the upper end of the base and showing the position of the dental floss.

Referring to the drawings, numeral 10 represents a dental floss holder comprising a cap 11 and a base 12. The cap 11 has a hollow lower portion 13 with an interior threaded portion 14 at its base. The lower edge 15 is rounded, as shown at 16, so that it will not irritate the cheeks, gums or tongue of the user. Depending from lower edge 15 are a pair of opposed projections 17, 17 which are slightly tapered towards their ends, as shown at 18 and which are slightly thinner than the thickness of the lower portion 13 to permit the dental floss 20 to become wedged between the projections 17, 17 and the upper part of the base (as will be more fully described hereinafter). A slit 19 is provided on one side of each of the projections 17 to wedge the floss therein for further gripping.

The upper part of the cap 11 has a large tooth-like prong or projection 21 and a smaller prong 22. Each of the prongs 21 and 22 are slightly tapered towards the upper ends and the sides are rounded so as not to injure the gums and cheeks of the user. The extreme tops of prongs 21 and 22 are slitted, as shown at 23 and 24, respectively, to hold and further wedge the dental floss within such slits. The outer face of each prong 21—21 has a shallow angular channel or groove 25 and 26 leading from the upper slit to the lower slit 19 to house the floss so that the dental floss will lie below the outer surface of each prong in order to prevent irritation of the gums and cheeks. It should be noted that the larger prong 21 has its outer edge or side 27 slightly convexly curved while the smaller prong 22 has its outer side 28 in a vertical plane (for reasons as will be hereinafter explained).

The base 12 is hollow to receive and house a spool of dental floss. Its upper end has a shoulder 29 which acts as a stop for cap 11 and an exteriorly threaded upper portion 30 somewhat less in diameter than that of the upper part of the base 12 itself. The threaded portion 30 has a vertical channel or groove 31 running slightly below the shoulder 29 for the dental floss to pass out of the base 12. The threaded portion 30 coacts with the interiorly threaded portion of the cap 11 to seat the cap 11 upon the base 12. The base 12 tapers downward, as shown in the figures and may be serrated, grooved or ribbed (not shown) to provide a firmer or better grip for the fingers, if desired. Embedded in the upper wall of the base, below the shoulder 29, is a piece of metal 32 having an angular cutting member 33 bent outwardly and which may be used either to cut or hold the dental floss.

The threads 14, 30 are so arranged that the cutting member 33 and the channel 31 appear slightly to the left of the projections 17, 17.

In threading the holder, the spool of dental floss 20 is placed within the hollow base 12 with the thread running through the channel 31. The floss is then wedged beneath projection 17 and drawn upward into the slit 19; then the floss is laid into groove 26 and then into slit 23. The floss then bridges the two prongs 21 and 22 and is laid into slit 24 and channel or groove 25; then into slit 19 and it is then drawn beneath projection 17 and wedged between this projection and the upper part of the base below the shoulder 29 and is then also wedged between the cutting member 33 and the metal piece 32. Of course, the dental floss is tightly drawn during the process of threading so that the floss which bridges the prongs 21, 22 is very taut. Since the floss is wedged between both projections 17 and the upper part of the base and in the slits 23, 24 and slits 19 and between the cutting member 33 and metal piece 32, that is, at seven places, it is held extremely taut and provides a floss bridge which is immovable for all practical purposes of cleaning the interstices between the teeth.

After the teeth have been cleaned, it is a simple matter to unwedge the floss, cut the unwanted part at the cutting member 33 and rethread the floss for future or additional use.

It has been explained that prong 21 is higher than prong 22 so that the floss bridges the two teeth at an angle. Also that prong 21 is convexly curved while prong 22 is vertical at the outer portions. These contours permit the holder or device to move the bridged floss in almost every direction, that is, straight up and down for anterior teeth, up and down for posterior teeth and virtually make any desired angle changes for the upper and lower teeth without injuring the gums, cheeks and tongue.

It is obvious that various changes and modifications may be made in the details of construction and arrangement of parts without departing from the general spirit of the invention.

I claim:

1. A dental floss holder comprising a hollow cap and a hollow base for housing a spool of dental floss, said cap having its lower hollow portion interiorly threaded and its lower outer edge rounded, a pair of opposed projections depending from said lower edge for wedging said dental floss between said projections and said base, said projections slightly thinner than the thickness of said lower cap and tapered at the inner lower ends to direct the floss between said projections and said base, a vertical slit in the lower edge of said cap adjacent one side of each of said projections for wedging in said dental floss, the upper part of said cap having a large prong and a smaller prong substantially in the same plane, said prongs tapered towards the upper ends and having rounded sides, the tops of each of said prongs having a slit to permit said dental floss to form a bridge between said prongs and to hold and wedge said dental floss therein, a shallow angular channel on each of the outer faces of said prongs between the slit of said prongs and the slit adjacent said projection to house the dental floss below the plane of the outer surface of said prongs, said larger prong having its outer face convexly curved, said smaller prong having its outer face in substantially a vertical plane, said base having an upper shoulder acting as a stop for said cap and an exteriorly threaded upper portion smaller in diameter than the upper part of said base to coact with said interiorly threaded portion of said cap for seating said cap thereon, a vertical channel in said exteriorly threaded portion running from its outer edge to slightly below said shoulder for passing said dental floss from within said base to the outside, a cutting and floss holding member at the upper part of said base below said shoulder opposite said vertical channel, said cutting member and said vertical channel being adjacent said projections when said cap is on said base, whereby said dental floss may be threaded through the lower part of said vertical channel, beneath one of said projections, through a slit adjacent said projection, through the slits of said prongs and through the slit and behind the opposite said projection and behind said cutting member to firmly hold said floss in position bridging said two prongs.

2. A dental floss holder comprising a hollow cap and a hollow base for housing a spool of dental floss, said cap adapted to be seated upon the upper part of said base, a pair of opposed projections depending from the lower edge of said cap for wedging said dental floss between said projections and said base, a vertical slit in the lower edge of said cap adjacent one side of each of said projections for wedging in said dental floss, the upper part of said cap having a large prong and a smaller prong substantially in the same plane, the tops of each of said prongs having a slit to permit said dental floss to form a bridge between said prongs and to hold and wedge said dental floss therein, a shallow angular channel on each of the outer faces of said prongs between the slit of said prongs and the slit adjacent said projection to house the dental floss below the plane of the outer surface of said prongs, said larger prong having its outer face convexly curved, said smaller prong having its outer face in substantially a vertical plane, said base having an upper shoulder acting as a stop for said cap, a vertical channel in the upper part of said base running from its outer edge to slightly below said shoulder for passing said dental floss within said base to the outside, a cutting and floss holding member at the upper part of said base below said shoulder opposite said vertical channel, said cutting member and said vertical channel being adjacent said projections when said cap is on said base, whereby said dental floss may be threaded through the lower part of said vertical channel, beneath one of said projections, through a slit adjacent said projections, through the slits of said prongs and through the slit and behind the opposite said projection and behind said cutting member to firmly hold said floss in position bridging said two prongs.

3. A dental floss holder comprising a hollow cap and a hollow base for housing a spool of dental floss, said cap adapted to be seated upon the upper part of said base, a pair of opposed projections depending from the lower edge of said cap for wedging said dental floss between said projections and said base, the upper part of said cap having a large prong and a smaller prong substantially in the same plane, the top of each of said prongs having a slit to permit said dental floss to form a bridge between said prongs and to hold and wedge said dental floss therein, said larger prong having its outer face convexly curved, said smaller prong having its outer face in substantially a vertical plane, said base having an upper shoulder acting as a stop for said cap, a vertical channel in the upper part of said base slightly below said shoulder for passing said dental floss from within said base to the outside, a cutting and floss holding member at the upper part of said base below said shoulder, said cutting member and said vertical channel being adjacent said projections when said cap is on said base, whereby said dental floss may be threaded through the lower part of said vertical channel, beneath one of said projections, through the slits of said prongs, and behind said cutting member to firmly hold said floss in position bridging said two prongs.

4. A dental floss holder comprising a hollow cap and a hollow base for housing a spool of dental floss, said cap adapted to be seated upon the upper part of said base, a pair of opposed projections depending from the lower edge of said cap for wedging said dental floss between said projections and said base, the upper part of said cap having a large prong and a smaller prong substantially in the same plane, the tops of each of said prongs having a slit to permit said dental floss to form a bridge between said prongs, said base having an upper shoulder acting as a stop for said cap, an opening in the upper part of said base slightly below said shoulder for passing said dental floss from within said base to the outside, a cutting member at the upper part of said base below said shoulder, whereby said dental floss may be threaded through said opening in the upper part of said base beneath one of said projections, through the slits of said prongs and behind said cutting member to firmly hold said floss in position bridging said two prongs.

5. A dental floss holder comprising a cap and a hollow base for housing a spool of dental floss, said cap adapted to be seated upon the upper part of said base, a pair of opposed projections depending from the lower edge of said cap, the upper part of said cap having a large prong and a smaller prong, the tops of each of said prongs having a slit to permit said dental floss to form a bridge between said prongs, an opening in the upper part of said base for passing said dental floss from within said base to the outside, a cutting member at the upper part of said base, whereby said dental floss may be threaded through said opening beneath one of said projections, through the slits of said prongs, and behind said cutting member to firmly hold said floss in position bridging said two prongs.

MAXIMILIAN COHEN.

References Cited in the file of this patent

UNITED STATES PATENTS

| Number | Name | Date |
| --- | --- | --- |
| 1,239,633 | Stickler | Sept. 11, 1917 |
| 1,368,555 | Henerlau | Feb. 15, 1921 |
| 1,498,853 | Oliver | June 24, 1924 |